United States Patent [19]

Breen

[11] Patent Number: 4,969,653

[45] Date of Patent: Nov. 13, 1990

[54] RADIAL LIP OIL SEAL

[75] Inventor: Bryan S. Breen, Dearborn Heights, Mich.

[73] Assignee: Federal-Mogul Corporation, Southfield, Mich.

[21] Appl. No.: 416,900

[22] Filed: Oct. 4, 1989

[51] Int. Cl.$^5$ .............................................. F16J 15/54
[52] U.S. Cl. .................................. 277/134; 277/153; 277/208; 277/227
[58] Field of Search ............... 277/152, 153, 134, 227, 277/223; 220/339, 337

[56] References Cited

U.S. PATENT DOCUMENTS

| | | | |
|---|---|---|---|
| 4,239,243 | 12/1980 | Bainard et al. | 277/153 |
| 4,311,316 | 1/1982 | Cather, Jr. | 277/1 |
| 4,501,431 | 2/1985 | Peisker et al. | 277/134 |
| 4,613,143 | 9/1986 | Butler | 277/134 |
| 4,822,058 | 4/1989 | Bulter et al. | 277/152 |

Primary Examiner—William A. Cuchlinski, Jr.
Assistant Examiner—Daniel G. DePumpo
Attorney, Agent, or Firm—Lawrence J. Shurupoff

[57] ABSTRACT

A shaft seal includes a rigid case and an elastomeric seal body affixed thereto. The seal body member includes a primary sealing lip and a secondary sealing lip axially spaced from one another by an intermediate flex section. The sealing surfaces of both sealing lips are lined with a singular piece of low friction material in the form of a single annular wafer having radially inner and outer liner portions covering the primary and secondary sealing lips. The wafer is formed with a weakened material section intermediate the inner and outer annular liner portions for increasing the flexibility and independent operation of each sealing lip.

5 Claims, 3 Drawing Sheets

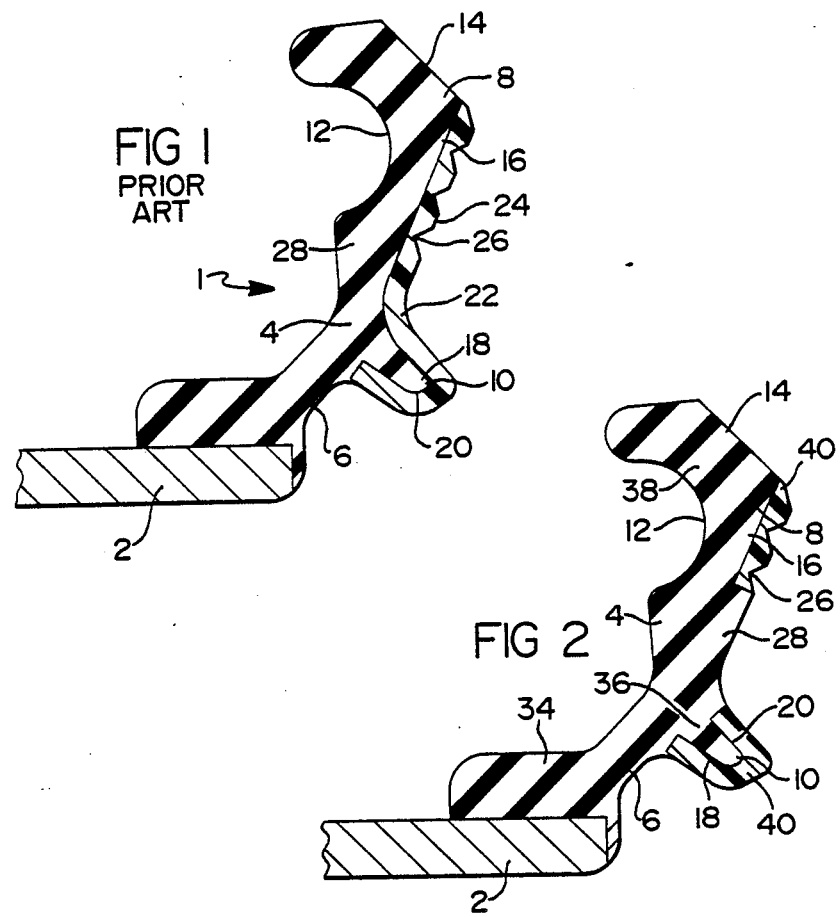
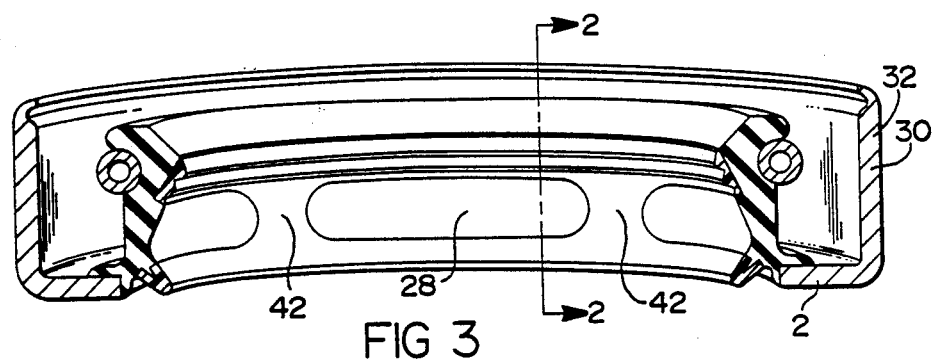

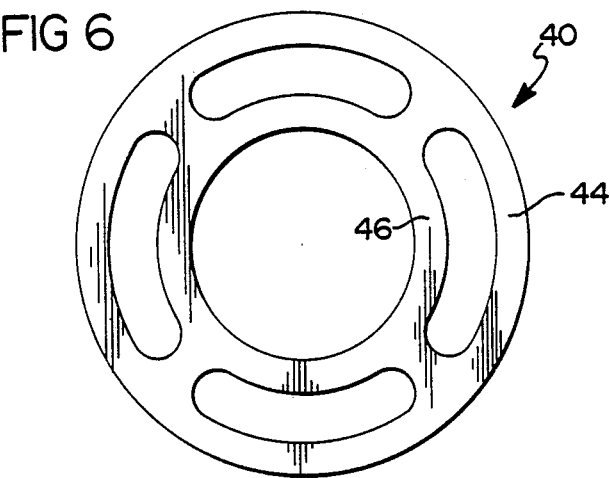
FIG 6
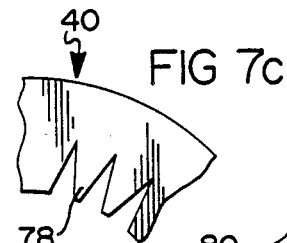
FIG 7b
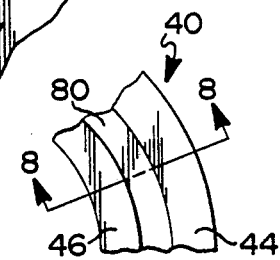
FIG 7c
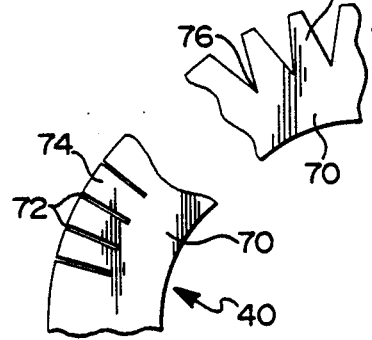
FIG 7a
FIG 7d
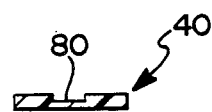
FIG 8

RADIAL LIP OIL SEAL

TECHNICAL FIELD

The present invention relates to a radial lip type oil seal having a primary sealing lip and secondary sealing lip, each lined with a low friction material.

BACKGROUND OF THE INVENTION

Radial lip oil seals having an elastomeric body portion thermally bonded to an annular, usually cup-shaped, metal case have been in use for many years. Such seals are generally used between relatively rotatable parts to seal oil or grease in a predetermined location for lubrication. Common applications for these seals include sealing vehicular engine crankshafts and transmission shafts. In each case, the elastomeric body portion of the seal is usually designed to include an annular flex portion of reduced cross-sectional thickness bonded to the metal case member and located intermediate the seal lip and metal case. The purpose of this flex section is to allow the seal lip to stay in continuous, intimate contact with the shaft it is to seal despite any lack of concentricity between the relatively rotating members, e.g. the rotating shaft and the stationery engine block into which the annular metal case member is usually press-fit or otherwise nonrotatably secured.

It is also known that for certain applications, particularly off-road vehicular applications such as earth hauler and tractor applications, it is desirable that the elastomeric oil seal include at least one secondary seal lip, axially spaced from the primary seal lip, for the purpose of excluding dirt, dust and other particulate type contaminants from the primary seal lip. During the molding process of such "dual lip" seals, the anchoring portion of the annular metal case is clasped between an upper and lower die and extends within a molding cavity formed by the two. A common annular ring of elastomeric prep material is heated within the mold and subsequently flows within the die cavity filling it, forming the primary and secondary seal lips and a common flex section opposite the entrapped anchoring portion of the metal case. Upon cooling and stripping the seal from the mold, the two lips are seen to be joined to the metal case by the common flex section. Further, that portion of the elastomeric body portion intermediate the primary and secondary seal lips also functions as a secondary flex section.

As a result of the common flex section, each seal lip in operation is relatively independent of the case member. That is, each seal lip can accommodate shaft eccentricity with the axis of the metal case member and with the bore in which it is located. Further, as a result of the second or intermediate flex section, the primary and secondary sealing lips are fairly operationally independent of one another. That is, because the elastomeric material is relatively soft and pliable, each seal lip can accommodate shaft surface irregularities appearing only at that one seal lip, such as some localized out of roundness, without affecting the performance of the other seal lip. For certain seal designs, the common flex section and the secondary flex section may be one and the same.

U.S. Pat. No. 2,992,027 presents a discussion of this same operational characteristic and suggests that the design of the flex section itself, which is intermediate the primary and secondary seal lips, may be altered to assure independent action.

Most recently, the wear characteristics of this general seal design have been enhanced by lining the sealing surface of each seal lip with a low friction, high wear resistant material such as polytetrafluoroethylene (PTFE) or the like. An example of this design is shown in U.S. Pat. No. 4,171,561. While such a design enhances at least the long life characteristics of the oil seal, it has been found that the benefit of the relatively independent action of the primary and secondary seal lips relative to one another has been diminished by the stiffness of the PTFE liner which extends across the secondary flex section.

Consequently, attempts have been made to economically provide an oil seal of this type with both seal lips lined with low-friction material but without sacrificing the independent flexibility of each.

One such design includes a method of manufacture which allows the use of a single annular prep material piece and a single PTFE liner wafer with the inherent cost and molding process advantages of such a design, namely that shown in U.S. patent application Ser. No. 347,920, assigned to the assignee of the present invention. By such technique, the PTFE wafer is split during mold closure into two separate annular rings, one for the primary lip and the other for the secondary lip. Unfortunately, the reliability of the freed wafer being split and locating consistently in the final design position by the hydrodynamic force of the flowing elastomeric prep material can not always be assured.

SUMMARY OF THE INVENTION

According to the present invention, there is provided a multiple lip elastomeric oil seal wherein each lip sealing surface is lined with a low-friction, high wear resistent single liner common to each lip yet which provides increased flexibility and independent action to each lip.

More specifically, the invention contemplates a seal for sealing fluids around a shaft, wherein the seal comprises a seal case and an elastomeric seal body mounted to the seal case and including a primary seal lip and a secondary seal lip. A fluorinated resin seal lip liner is bonded to the seal body and covers the primary and secondary seal lips. The liner is formed with a weakened material section located between the primary and secondary lips for increasing flexibility therebetween, i.e. across the secondary flex section.

It is therefore one object of the present invention to provide an elastomeric oil seal having at least one primary sealing lip and at least one secondary sealing lip, each being bonded to a metal case member by a common elastomeric flex section and each being lined by a common liner wafer formed of low-friction material It is another object of the present invention to be able to produce the above-described type seal by a molding technique used to form single lip type seals having a low-friction material liner.

It is a further object of the present invention to provide the above-described type seal wherein each seal lip shall be relatively uninfluenced by the operational characteristics of the other.

The objects, features, and advantages of the present invention are readily apparent from the following detailed description for carrying out the invention when taken in connection with the accompanying drawings.

BRIEF DESCRIPTION OF THE DRAWINGS

FIG. 1 is a partial cross-sectional view of a lined, dual-lip shaft seal according to the prior art;

FIG. 2 is a partial cross-sectional view of a lined, dual-lip shaft seal in accordance with the present invention and taken along the lines of 2—2 in FIG. 3;

FIG. 3 is an elevational view showing a shaft seal in cross-section in accordance with the present invention;

FIG. 6 is a plan view of the low-friction material liner constituting a component of the shaft seal in accordance with the present invention;

FIGS. 7a through 7d are partial plan views of several alternative designs for a low-friction material liner in accordance with the present invention; and FIG. 8 is a cross-sectional view taken along the lines 8—8 of FIG. 7.

BEST MODE FOR CARRYING OUT THE INVENTION

Figure 4:
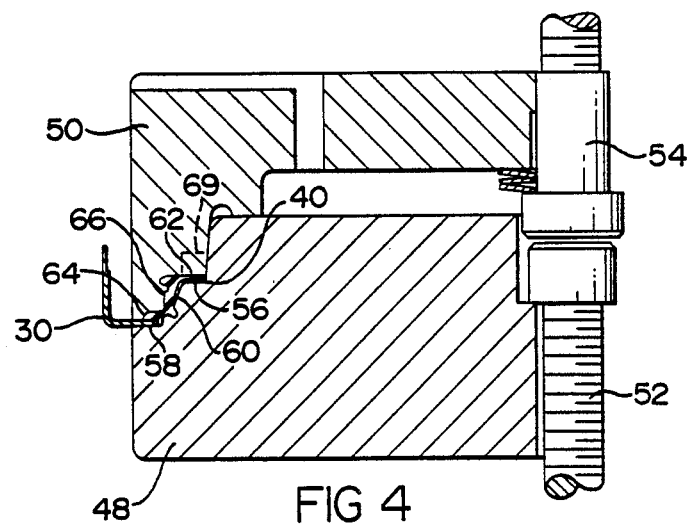
FIG. 4 is a partial cross-sectional elevational view of a mold during the molding operation showing the location of the shaft seal components within the fully closed mold cavity.

Referring now to the drawings, in FIG. 1 there is shown a shaft seal which is known in the prior art. It includes an annular seal body portion, generally designated 1, bonded to a radial flange member 2 forming a portion of an annular cup shaped case described below. The annular seal body portion 4 includes a flexible neck portion 6 nearest the anchored portion of the seal body. The remainder of the seal body 4 includes a primary seal lip 8 and a secondary seal lip 10.

At the primary sealing lip 8 there is provided a spring retention groove 12 for retaining an annular spring which holds the primary seal lip in light compression upon the shaft on which it is to be mounted for purposes of maintaining intimate sealed contact with the shaft. Both the primary sealing lip 8 and the secondary sealing lip 10 are formed by a respective pair of converging sidewalls 14, 16, and 18, 20 meeting at an apex defining the static sealing band for each such lip. Further, it will be seen that the sealing lips are provided with a liner 22 of low friction material such as filled or unfilled polytetrafluoroethylene (PTFE) or the like.

Liner 22 is of one-piece construction and is of generally uniform cross-sectional thickness with the exception of the one sidewall of the primary sealing lip, namely the air side 24 which is seen to include a series of hydrodynamic groove configurations 26. Generally these groove configurations are in the form of a single spiral groove hydrodynamically coined in a known fashion into the PTFE liner during the molding process in which the elastomeric seal body member and the polytetrafluoroethylene liner are bonded to one another and the seal body member bonded to the flange 2.

That portion of the seal body 4 which lies intermediate the primary and secondary seal lips constitutes, in effect, a second flex section, generally designated 28. It is important that sufficient flexibility be maintained in this section such that the primary or secondary seal lip can accommodate localized shaft surface irregularities such as an out-of-round condition without affecting the performance of the other seal lip. Unfortunately, since the polytetrafluoroethylene liner material is considerably stiffer than the elastomeric material of the seal body, a great deal of the flexibility otherwise present between the two seal lips is lost.

Looking now principally at FIGS. 2, 3, 5 and 6, the principal features of the present invention will be understood. Like reference numerals are used when referring to the same seal components shown and described in connection with FIG. 1.

It will be seen that the shaft seal of the present invention includes an annular elastomeric seal body member 4 bonded to an annular cup-shaped rigid, preferably metal, case member 30. The case member 30 includes a cylindrical wall member 32 and a radial flange 2 extending therefrom. The elastomeric seal body member is bonded to the flange 2 at its free end. The sealed body 4 includes, in axially progressing order, an anchor portion 34, a flexible neck portion 6, a secondary seal lip portion 36, an intermediate flex portion 28, and a primary seal lip portion 38.

Each primary and secondary seal lip portion 36, 38 includes a sealing lip 8, 10 formed by generally radially converging sidewalls 14, 16, 18 and 20 respectively. Radially opposite the primary seal lip is located a spring retention groove 12 in which there is adapted to be retained an annular coil spring 39 (FIG. 5) for purposes of assuring that the primary seal lip is held with adequate consistent compressive load upon the shaft. The primary and secondary seal lips 36 and 38 are each covered with a liner 40 of low friction fluorinated resin material such as polytetrafluoroethylene or the like. Further, it is preferred for some applications that the primary sealing lip include hydrodynamic configurations 26 within the polytetrafluoroethylene liner 40.

Figure 5:
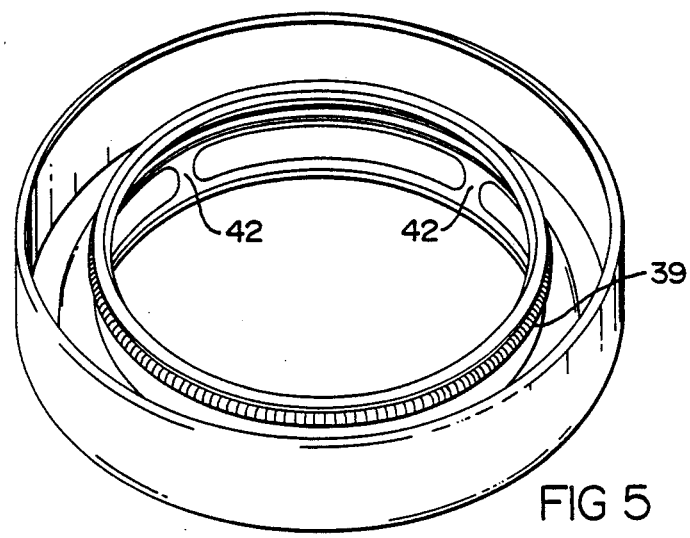
FIG. 5 is a full perspective view of the shaft seal shown in FIGS. 2, 3 and 4.

Unlike the prior art, it will be noted from FIG. 2 that the intermediate flex section 28 is not completely covered by the liner material. Rather it will be seen particularly from FIGS. 2 and 3 that the liner 40 is substantially devoid of material intermediate the annular end portions covering the primary and secondary seal lips. As seen in FIGS. 3 and 5 the annular liner end portions are connected by axially extending web members 42. The web members 42 each are of minor circumferential length, in the order of 3 to 5 arc degrees.

The liner, prior to molding, is shown in FIG. 6. It includes an outer annular liner portion 44 which will cover the primary seal lip and an inner annular liner portion 46 which covers the secondary seal lip. The web portions 42 should be at least two in number, but any suitable number may be used. The weakened liner section does not affect the flexibility of the otherwise all elastomeric flex section 28. However, since the web portions maintain the inner and outer annular liner portions as a single liner 40, the molding operation for the shaft seal can be as economically designed and performed as with the prior art design shown and described in connection with FIG. 1.

FIG. 4 shows the mold used to produce a shaft seal in accordance with the present invention. It includes a lower die 48 and an upper die 50, each held firmly to respective relatively reciprocal mold members (not shown) by bolts 52 and 54 respectively. The lower die 48 includes an upper land 56, a lower land 58 and an intermediate frustoconical portion 60 therebetween. The upper die portion likewise includes an upper land 62, a lower land 64 and an intermediate portion 66 therebetween. The two intermediate portions 60 and 66 define the mold cavity and resulting seal lip configuration.

At the beginning of the mold step, the cup shaped metal case member 30 is first placed on the lower land 58 of the lower die and the PTFE liner 40 and an annular ring of prep material 69 (shown in phantom) is placed on the upper land 56 of the lower die in sequential order. The lower lands of each die member act to hold the metal case member in place throughout the closure of the mold by spring loaded rod members, not shown (or the like). The upper land 56 of the lower die member 48 may be provided with a series of serrations or teeth in order to grip the PTFE liner and hold it in place throughout the closure of the mold. Such an arrangement is shown in U.S. Pat. No. 4,464,322, assigned to the assignee of the present invention, the disclosure of which is incorporated herein by reference.

As the mold is heated and closed, the elastomeric prep is softened considerably and caused to flow within the mold cavity from the upper lands towards the lower lands, bending and conforming the PTFE liner 40 to shape as it flows by virtue of the hydrodynamic force caused by the substantially liquid elastomer.

Once the mold is completely closed and the elastomer has consequently completely filled the mold cavity, the elastomer is then cured. The seal is then cooled and the mold members opened and the seal thereafter lifted from the mold. It is conventional that a certain amount of flash will be left at the mold juncture defining the primary sealing lip. This flash is removed from the seal by slicing it with a knife. This basically completes the molding and trimming operation and produces the finished product.

Alternative configurations for the polytetrafluoroethylene liner 40 can be provided, as shown in FIGS. 7a through 7d. For example, as shown in FIG. 7a, the liner 40 can include a first inner annulus 70 and a radially outwardly extending weakened section formed by a series of narrow slots or slits 72 producing a plurality of liner web portions 74.

Likewise as shown in FIG. 7b, there can be provided an inner annular portion 70 and an intermediate weakened section 76 formed by a series of triangular or trapezoidal web portions 78 extending radially outward therefrom. It is preferred that the depth of the cuts or cut out portions forming the web portion 78 be such that the uninterrupted inner annular liner portion will not extend beyond the axial extremities of the primary sealing lip. In other words, it is desirable that the PTFE material within the intermediate flex section 28 of the elastomeric seal body member 4 be maintained at a minimum.

Another alternative embodiment is that shown in FIG. 7c wherein the outer annular liner portion is uninterrupted and the web portions 78 extend radially inwardly so that the primary seal lip will include a static sealing band that is alternately PTFE liner material and elastomeric material.

Finally, in FIG. 7d, there is shown a fourth embodiment wherein the weakened material section of the liner includes an annular groove 80 separating the inner and outer liner portion 46 and 44. The intermediate portion is of substantially reduced cross-sectional thickness thereby providing a great deal of flexibility between the inner and outer annular liner portions, as seen particularly in FIG. 8.

Referring again to the embodiment shown in FIG. 7d and FIG. 8, the intermediate weakened material section 80 of reduced cross-section can be formed any number of ways, for example by removing the material, or coining it prior to the molding operation, or hydrodynamically coining it during the molding operation.

Obviously numerous modifications and variations of the present invention are possible in light of the above teachings. It is therefore to be understood that within the scope of the appended claims, the invention may be practiced otherwise than as specifically described herein.

What is claimed is:

1. A seal for sealing fluids around a shaft, said seal comprising:
   a seal case;
   an elastomeric seal body mounted to said seal case, said seal body comprising a primary seal lip, a secondary seal lip and a flex section located between said lips, and
   a fluorinated resin seal lip liner bonded to said seal body and covering at least partially said primary and secondary seal lips, said liner comprising a weakened material section in the form of reduced liner material exposing a portion of said elastomeric seal body located between said primary and secondary lips for increasing flexibility therebetween.

2. A shaft seal for sealing fluids around a shaft, said seal comprising:
   an annular rigid cup-shaped case member including a cylindrical wall member and a flange member generally radially extending from said cylindrical wall member;
   said flange member having a free end;
   an elastomeric seal body member affixed to said flange member at said free end;
   said seal body member including a primary seal lip portion, a secondary seal lip portion and an annular, axially extending intermediate seal body portion located between said primary and secondary lips;
   said intermediate seal body portion constituting a flex section between said seal lip portions; and
   a fluorinated resin seal lip liner bonded to said seal body, and covering at least partially said primary and secondary seal lips, said liner comprising a
   - weakened material section in the form of reduced liner material exposing a portion of said elastomeric seal body located between said primary and secondary lips for increasing flexibility therebetween.

3. A seal for sealing fluids around a shaft, said seal comprising:
   a seal case;
   an elastomeric seal body mounted to said seal case, said seal body comprising a primary seal lip and a secondary seal lip; and
   a fluorinated resin seal lip liner bonded to said seal body and comprising a first liner portion completely covering said primary seal lip portion, a concentric second liner portion at least substantially covering said secondary seal lip portion, a plurality of extending web members located between said first and second liner portions, and a weakened material section located between said primary and secondary lips for increasing flexibility therebetween.

4. A seal for sealing fluids around a shaft, said seal comprising:
   a seal case;

an elastomeric seal body mounted to said seal case, said seal body comprising a primary seal lip and a secondary seal lip; and a fluorinated resin seal lip liner bonded to said seal body and comprising a first annular liner portion completely covering said primary seal lip, a concentric second annular liner portion completely covering said secondary seal lip and a weakened material section comprising an intermediate annular portion of substantially reduced thickness from that of said first and second annular liner portions, said weakened material section located between said primary and secondary lips for increasing flexibility therebetween.

5. A seal for sealing fluids around a shaft, said seal comprising:

a seal case;

an elastomeric seal body mounted to said seal case, said seal body comprising a primary seal lip and a secondary seal lip; and a fluorinated resin seal lip liner bonded to said seal body, said liner comprising a polytetrafluoroethylene wafer of substantially uniform thickness, a first annular liner portion completely covering one said seal lip, and a series of radially extending, substantially equally spaced web portions extending from said first annular liner, said series of web portions constituting a weakened material section located between said primary and secondary lips for increasing flexibility therebetween.

* * * * *